UNITED STATES PATENT OFFICE.

ROBERT C. SCHÜPPHAUS, OF BROOKLYN, NEW YORK.

PYROXYLIN COMPOUND.

SPECIFICATION forming part of Letters Patent No. 598,649, dated February 8, 1898.

Application filed June 30, 1897. Serial No. 642,959. (No specimens.)

*To all whom it may concern:*

Be it known that I, ROBERT C. SCHÜPPHAUS, chemist, of Brooklyn, New York, have invented certain new and useful Improvements in Pyroxylin Compositions and in the Manufacture of Such Compositions, of which the following is a full, clear, and exact description.

Among plastic pyroxylin compounds the composition of soluble pyroxylin and camphor is still the most important. Many more or less successful attempts have been made to replace the camphor by substances free from the inherent defects of camphor in relation to the pyroxylin composition. Camphor itself, easily obtainable in great quantities in a state of sufficient purity, is a powerful solvent of pyroxylin and is abundantly soluble in the ordinary menstrua of this art, and, being colorless, it would be almost the ideal substance were it not for its objectionably-noticeable odor and its volatility, which latter quality gives rise to shrinkage and warping of the finished material, a defect that cannot be overcome entirely even by prolonged seasoning. The high melting-point of camphor relative to the decomposing-point in heating pyroxylin is no longer a serious drawback, because I have shown in my Patent No. 514,838, dated February 13, 1894, a manner of producing perfectly transparent pyroxylin-camphor composition which suffer no deterioration from acid decomposition during any of the processes of manipulation and manufacture. This result is accomplished by the use of urea or carbamid in the composition, as described in the patent just referred to. Aromatic nitrohydrocarbons, though suitable for explosive pyroxylin compounds, are not preferable to camphor for the many uses to which plastic pyroxylin compounds are put, because they add to the inflammability as a composition. The color of these nitro compounds is not objectionable and presents no difficulties except where perfectly colorless compositions are desired.

It is also true that, as I have shown in my Patent No. 528,812, dated November 6, 1894, by combining various members of the class of alkoyl derivatives of aromatic amins with pyroxylin most valuable compounds may be obtained, and the melting-point of the solid solvents used may be practically regulated at will by combining two or more solvents of different melting-points, as well understood by chemists. The use of still other solvents is set forth in my Patents Nos. 410,205 and and 410,206, of September 3, 1889. I have endeavored to discover, among other things, solid solvents of pyroxylin which should combine great solvent power, absence of volatility, suitable melting-points, and considerable solubility in one or more menstrua applicable to the manufacture of pyroxylin compounds. Some of the substances which I have so discovered in their relation to pyroxylin, though well known for other purposes, form the subject of this specification. In the use of my new solvents the several processes by which plastic compounds of various character are produced need not necessarily be changed in any material feature. I prefer to dissolve the solid solvent in a suitable menstruum, as has almost always been done, in point of fact, in commercial manufacturing operations, notwithstanding that statements are contained in a number of patents describing other methods as being possible.

The new solvents which form the subject-matter of this application either alone or with other substances are all of them aromatic ketones. Of the ones enumerated below those having a melting-point sufficiently below the decomposing temperature of the particular grade of pyroxylin to be treated when melted dissolve the soluble pyroxylin of the grades used for preparation of plastic compounds, of collodoin, and of varnishes. In alcoholic solutions they also gelatinate, such grades of pyroxylin showing an analogy of action to camphor.

Without attempting to enumerate equivalents, such as certain derivatives formed by the substitution of various radicals in the substances which I mentioned, the following eleven substances form the subject of this application: acetophenon, $(C_6H_5-COCH_3,)$ melting-point, 20.5° centigrade; benzylizene acetone, $(C_6H_5CH=CHCOCH_3,)$ melting-point, 41° to 42° centigrade; benzophenon, $(C_6H_5COC_6H_5,)$ melting-point, 48° to 48.5° centigrade; phenylbenzyl ketone, $(C_6H_5COCH_2C_6H_5,)$ melting-point, 54° to 55° centigrade; oxyacetophenon, $(C_6H_5COCH_2OH,)$ melting-point, 86° centigrade; benzil, $(C_6H_5-COCO-C_6H_5,)$ melting-point, 95° centigrade; dibenzylidene acetone, $(C_6H_5CH=CH)_2CO$, melting-point, 112° centigrade; trioxybenzophenon, $C_6H_4O\ HCOC_6H_3(OH)_2$, melting-point, 133° to 134° centigrade; para-oxybenzophenon, $(C_6H_5CO\ C_6H_4OH,)$ melting-point, 134° centigrade; oxyphenylbenzyl ketone, (benzoin,) $(C_6H_5CHOH\ COC_6H_5,)$ melting-point, 137° centigrade; trioxyacetophenon, gallacetophenon, $C_6H_2(OH)_3\ COCH_3$, melting-point, 168° centigrade. The indications are that other less readily obtainable ketones, especially those characterized by one or more carbonyl radicals, (CO,) in conjunction with one or more aromatic or aliphatic radicals possessing the requisite melting-points, are equivalents.

I have arranged the substances enumerated according to their melting-points, and it will be seen that the range of melting-points given is wide. By applying the principle of combining two or more members of my group of solvents, as first enunciated in my patent of November 6, 1894, numbered 528,812, the melting-point of the solvents may be regulated at will, and therewith the temperature at which the pyroxylin composition containing such solvents will become plastic may be controlled to a nicety.

The substances which I have enumerated are most of them readily obtainable on a large scale. Acetophenon is produced when acetate and benzoate of lime are subjected to dry distillation. Benzophenon is produced when benzoate of lime is distilled alone. Benzylidene acetone, dibenzylidene acetone, and benzoin are readily derived from benzaldehyde. Boiling with nitric acid converts benzoin quantitatively into benzil.

After careful consideration I have always been of the opinion that the action of camphor on nitrocellulose is a chemical phenomenon distinct from mere physical solution. In this view I have been confirmed by observing that camphor substitutes cannot properly be used in the same proportions as camphor, notwithstanding that the contrary has been asserted by one or more operators of considerable experience, not, however, chemists or carefully trained observers. The best quantities of the substances which I have enumerated as compared with the amount of camphor which these substances are to replace is for the same reason proportional to the molecular weights—that is to say, the camphor will be replaced by its molecular equivalent of the substances I have enumerated. This furnishes an exact method of determining the quantity to be used in place of camphor in the various pyroxylin compositions; but these instructions must be understood with a noteworthy exception, which also goes to prove the truth of my opinion which I have expressed above—namely, when the substance contains two carbonyl radicals in the molecule, it may be treated as a double molecule for the purpose of the rule, only one-half the molecular equivalent of that substance being needed to replace a given weight of camphor. Benzil is an instance of this exception. In substituting one of my new solvents the operator will be guided solely by these instructions and will proportion the quantity of the new solvents to be used to the quantity of camphor retained in the final fully-seasoned product which he seeks to improve by replacing some or all of the camphor. These ketones which I have enumerated are all more or less soluble in varying degress in organic solvents of pyroxylin, such as methyl alcohol, ethyl alcohol, amyl alcohol, ether, benzene, anisol, acetone, and the alcoholic acetates.

In order that the use of my new solvents may be perfectly clear to those unfamiliar with the principles of chemistry, as well as to chemists, to whom of course this specification is particularly directed, I will give a practical illustration of the use of benzil: The molecular weight of camphor is one hundred and fifty-two, that of benzil is two hundred and ten; but this latter figure is to be halved by reason of the presence of two carbonyl groups in the molecule as given above. Therefore, to replace thirty pounds of camphor I may use about twenty pounds of benzil, or, more exactly, $30 \times \frac{105}{152} = 20.7+$, using the same amount of pyroxylin—say one hundred pounds—and of other materials, excepting camphor, as would be done if my new solvents were not employed. As liquid solvent with benzil I prefer to use acetone. The compound so formed will be free from all objectionable odor and from the warping which characterizes camphor compounds. In the case of benzil a very pleasant slight odor is present until the composition has been thoroughly seasoned. Inert substances—such as dyes, pigments, and other substances used for producing various effects in the appearance—may be incorporated in the new compounds so formed, just as in the present well-known compounds.

It must not be understood from my frequent reference to solid plastic compositions that the use of these substances is in any way so limited. On the contrary, I wish particularly to have it understood that among other modes of procedure a pyroxylin solution containing one or more of my new solvents with a large amount of liquid solvent or menstruum may be made, and a film, sheet, coating, or other product may be made therefrom by evaporating.

I claim the following:

1. A pyroxylin composition containing pyroxylin and one or more of the group of substances characterized by the following: acetophenon, benzylidene acetone, benzophenon, phenylbenzyl ketone, oxyacetophenon, benzil, dibenzylidene acetone, trioxybenzophenon, para-oxybenzophenon, oxyphenylbenzyl ketone (benzoin), trioxyacetophenon, (gallacetophenon;) substantially as set forth.

2. As a new article of manufacture, a pyroxylin compound containing *inter alia* one or more of the following substances: acetophenon, benzylidene acetone, benzophenon, phenylbenzyl ketone, oxyacetophenon, benzil, dibenzylidene acetone, trioxybenzophenon, para-oxybenzophenon, oxyphenylbenzyl ketone, (benzoin,) trioxyacetophenon, (gallacetophenon,) substantially as set forth.

3. The improvement in the process of manufacturing pyroxylin compounds, which consists in incorporating one or more of the following substances with the pyroxylin: acetophenon, benzylidene acetone, benzophenon, phenylbenzyl ketone, oxyacetophenon, benzil, dibenzylidene acetone, trioxybenzophenon, para-oxybenzophenon, oxyphenylbenzyl ketone (benzoin), trioxyacetophenon, (gallacetophenon,) substantially as set forth.

In testimony whereof I have hereunto set my hand this 15th day of May, 1897.

ROBERT C. SCHÜPPHAUS.

Witnesses:
GEORGE H. SONNEBORN,
HAROLD BINNEY.